Aug. 31, 1965  D. H. J. REYNOLDS  3,203,579
CONTAINERS FOR LIQUIDS
Filed May 13, 1963  2 Sheets-Sheet 1
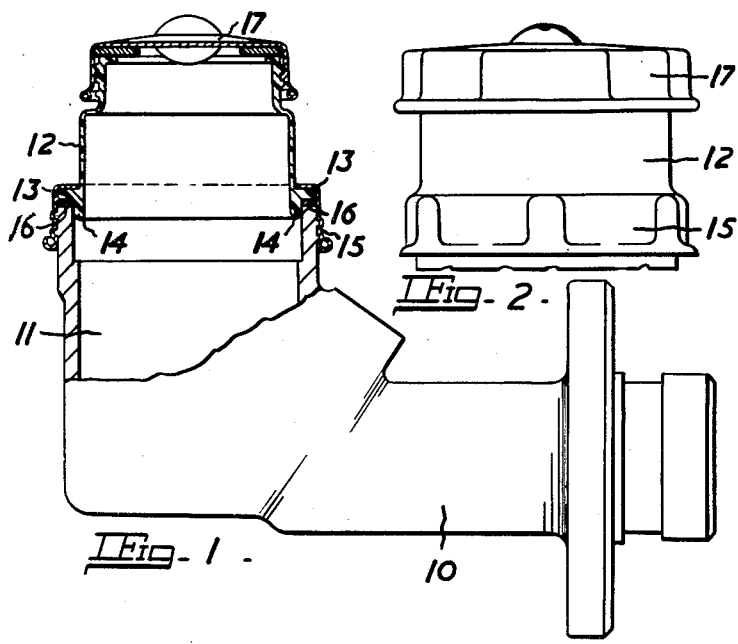
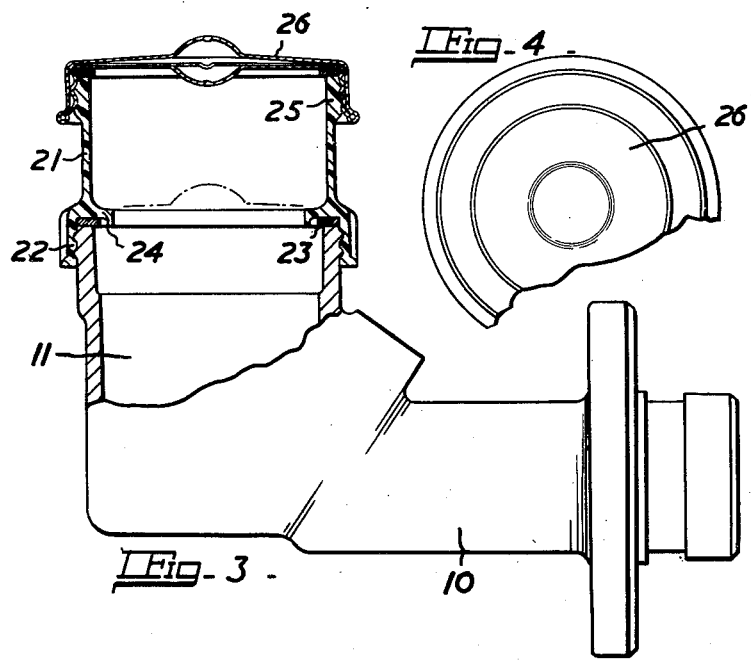
Desmond H. J. Reynolds
Inventor
By Scrivener & Parker
Attorneys

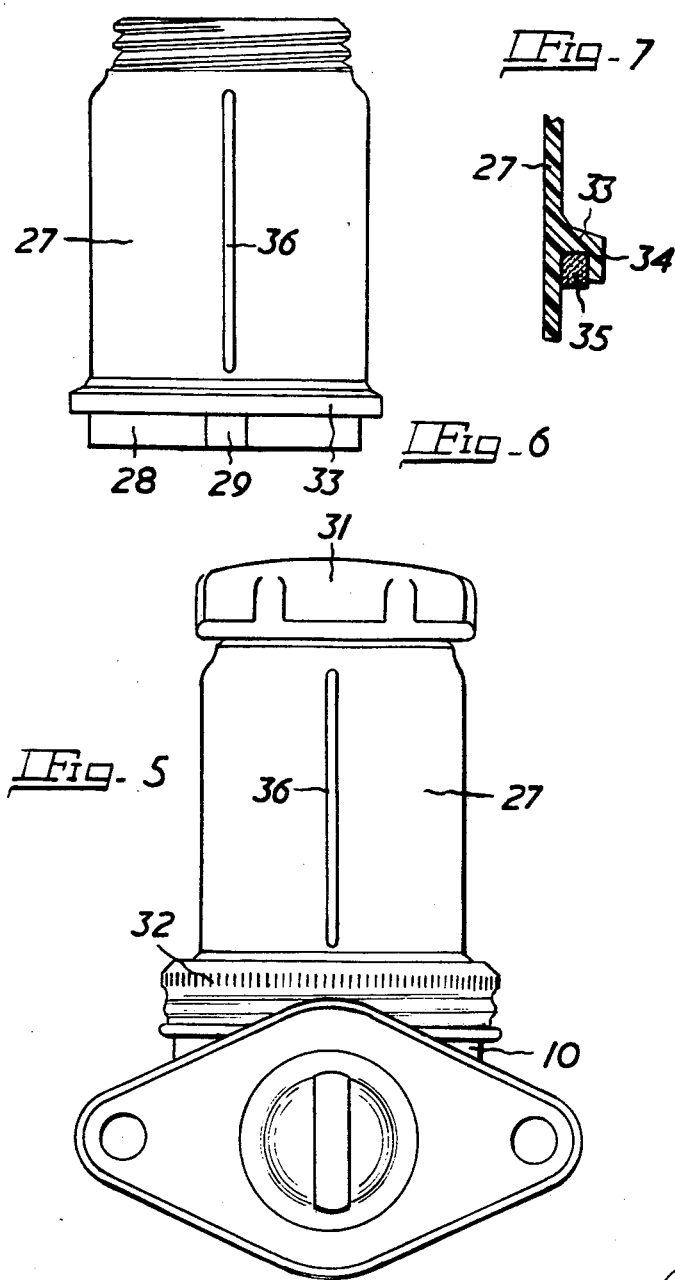

United States Patent Office 3,203,579
Patented Aug. 31, 1965

3,203,579
CONTAINERS FOR LIQUIDS
Desmond Henry James Reynolds, Sutton Coldfield, England, assignor to Girling Limited, Birmingham, England, a British company
Filed May 13, 1963, Ser. No. 279,730
4 Claims. (Cl. 220—82)

This invention relates to containers for liquids, and in particular containers of a kind forming a reservoir for supplying the liquid for some function, where it is important that the reservoir should be replenished before the liquid in it is exhausted or before the liquid level falls below a predetermined point. An outstanding example of such a case is that of the reservoir for an hydraulic circuit, such as the hydraulic brake-operating circuit of a motor vehicle.

To keep to a minimum the risk of the level of fluid in such a reservoir calling to a dangerous extent, it is known to provide float-operated alarm devices. It has also been proposed to make the entire container transparent to enable the liquid level to be observed easily without having to open the reservoir. It is an aim of the present invention to enable an existing opaque reservoir to be converted into one of which the liquid level can be checked without opening it, this conversion being effected without requiring any modification of the structure of the existing reservoir itself.

According to the invention, there is provided an extension piece in the form of an auxiliary container having at least a part of its side walls transparent or translucent, and having an opening in its lower end provided with means for forming a fluid-tight connection between this opening and the filler orifice of an existing container or reservoir, such as the reservoir of an hydraulic fluid braking system for a motor vehicle, and the extension piece being provided towards its upper end with an opening for the replenishment of fluid, this opening being provided with means for securing a closure cap over it.

This extension piece can be designed to fit in place of the filler cap of an existing hydraulic fluid reservoir, and the reservoir can then be filled with additional fluid so that the fluid level is within the extension piece and is visible from outside. In order to avoid having to provide a new filler cap, it is preferred to arrange that the filler opening in the upper end of the extension piece is designed to receive the existing filler cap of the main reservoir.

Two embodiments of our invention as applied to a reservoir for an hydraulic braking system are illustrated by way of example in the accompanying drawings in which:

FIGURE 1 is a side elevation of a combined master cylinder and reservoir for an hydraulic braking system with the upper part of the reservoir and the extension piece shown in section;

FIGURE 2 is a side elevation of the extension piece and clamping ring;

FIGURE 3 is a view similar to FIGURE 1, but showing an alternative construction for the extension piece;

FIGURE 4 is a plan of the extension piece shown in FIGURE 3;

FIGURE 5 is an end elevation of a combined master cylinder and reservoir fitted with a modified form of extension piece;

FIGURE 6 is an elevation of the extension piece alone; and

FIGURE 7 is a fragmentary section on a larger scale of the lower end of the wall of the extension piece.

In the arrangements shown in the drawings, 10 is a master cylinder for an hydraulic braking system combined with an integral reservoir 11 from which the system draws liquid as and when required. The reservoir comprises a cylindrical chamber of which the axis is vertical and which is open at its upper end. The reservoir is normally closed by a vented sheet metal cap which is screwed on to an external screw thread on the upper end of the reservoir and is removable for filling the reservoir with liquid.

In the arrangement shown in FIGURES 1 and 2, the capacity of the reservoir is increased by fitting to its upper end in fluid-tight engagement therewith a hollow extension piece 12 which is moulded from transparent or translucent plastic, and is of generally cylindrical shape with its top and bottom ends open. The bottom end has a radially projecting annular flange 13 adapted to fit against the upper end of the reservoir and a short spigot 14 adapted to enter the opening of the reservoir and locate the extension piece laterally. An internally screw-threaded metal ring 15 fits over the flange 13 and engages the external screw-thread on the reservoir to clamp the extension piece in place, a sealing washer 16 being interposed between the flange 13 and the upper end of the reservoir. As shown in FIG. 1 the diameter of the washer 16 is substantially the same as the internal diameter of the clamping member whereby the washer is restrained against radial expansion under clamping pressure.

The upper part of the extension piece is of slightly smaller diameter than the lower part and is formed with an external screw-thread to receive a vented closure cap 17.

As the extension piece is securely clamped against the upper end of the reservoir by the ring 15, there is no risk of the extension piece being loosened when the cap 17 is being unscrewed for the introduction of liquid.

In the arrangement shown in FIGURES 3 and 4, the extension piece 21 is moulded from a transparent or translucent plastic which has a certain degree of rigidity and is substantially free from creep, and it has at its bottom end a peripheral depending skirt portion 22 which has an internal screw-thread and is of such a diameter as to screw on to an existing external screw-thread on the reservoir which normally receives a closure cap. A sealing washer 23 is interposed between the upper end of the reservoir and an internal flange 24 in the extension piece. At its upper end, the extension piece is formed with a thickened wall portion 25 which has an external screw-thread and is of the same external diameter as the upper end of the reservoir so that it can receive the standard vented closure cap 26 provided for the reservoir, and when the extension piece is fitted the cap is simply transferred from the reservoir to the extension piece.

Where the upper end of the reservoir is provided with an internal screw-thread to receive a removable closure, the lower end of the extension piece may, of course, be formed with an external screw-thread to fit the thread in the reservoir and a radially projecting shoulder to engage the upper end of the reservoir.

In the modification shown in FIGURES 5, 6 and 7, the extension piece 27 is of substantially greater axial length and greater capacity than the extensions shown in FIGURES 1 to 4.

At its lower end the extension piece has a depending cylindrical spigot 28 adapted to enter the opening at the upper end of the reservoir, and a notch 29 is formed in the spigot for engagement with an internal lug or boss in the opening to prevent the extension from rotating with the closure cap 31 when the cap is being unscrewed. Alternatively, the spigot may be formed with a projection adapted to engage in a recess in the reservoir for the same purpose.

The extension piece is secured to the reservoir by an internally screw-threaded flanged ring 32 engaging an external screw-thread on the reservoir and fitting over a radially projecting annular flange 33 on the extension piece. The flange 33 has on its outer edge, as shown in FIGURE 7, a depending annular lip 34 providing between itself and the spigot 28 a downwardly facing annular groove to receive and retain a resilient or compressible sealing ring 35 for engagement with the upper end of the reservoir.

In its free state, the thickness of the sealing ring is slightly greater than the axial depth of the groove, and when the clamping ring 32 is tightened down the compressor of the sealing ring is limited by the engagement of the lip 34 on the flange with the end of the reservoir so that the sealing ring cannot be damaged by over-tightening the clamping ring.

The outer surface of the extension piece may be provided with any convenient marking such as the vertical line 36 and wording indicating the maximum and minimum permissible levels of the liquid.

It will be appreciated that in any of the arrangements illustrated, if a leak should occur at the joint between the extension piece and the reservoir, through faulty assembly or a faulty sealing washer, it is only the liquid in the extension piece which can be lost and the liquid in the reservoir is not affected.

When a combined master cylinder and reservoir assembly for an hydraulic brake system is mounted in a vehicle, the available space above the reservoir may be limited, but by making the extension piece with relatively thin walls, and, if necessary, making it of greater diameter than the reservoir, one can provide an adequate volume to allow for all normal losses of liquid between servicing periods.

While it is preferred to mould the extension piece wholly from transparent or translucent plastic, it would be possible to form it from opaque material with a window of transparent or translucent material in its wall for inspection of the level of liquid in the extension piece.

I claim:

1. Means increasing the effective capacity and for indicating the level of fluid in a reservoir for a master cylinder of an hydraulic braking system of which said reservoir is open at its upper end without said end being surrounded by a flat annular edge and provided at that end with an external screw-threaded portion, comprising a hollow tubular extension member of which as least part of its wall is of transparent or translucent material, an axially extending spigot portion at the lower end of said extension member received within the opening at the upper end of the reservoir, an outwardly extending radial flange integral with said extension member and seated against the upper end of said reservoir, an annular sealing washer interposed between said radial flange and said annular edge of said container, an internally screw-threaded ring clamping said extension member at its lower end to said reservoir and fitting over said radial flange and engaging with said external screw-threaded portion on the upper end of said reservoir, said sealing washer having an external diameter substantially equal to the internal diameter of said clamping member whereby said clamping member engages said washer to restrict its radial expansion under clamping pressure, and a detachable closure cap at the upper end of said extension member.

2. Means increasing the effective capacity and for indicating the level of fluid in a reservoir for a master cylinder of an hydraulic braking system of which said reservoir is open at its upper end and provided at that end with an external screw-threaded portion, comprising a hollow tubular extension member of which at least part of its wall is of transparent or translucent material, an axially extending spigot portion at the lower end of said extension member received within the opening at the upper end of the reservoir and positioning said extension member against movement in a lateral direction, an outwardly extending radial flange integral with said extension member, a depending annular lip on the outer edge of said radial flange defining between itself and said spigot portion a downwardly facing annular recess, a sealing washer received in said annular recess and engaging the upper end of said reservoir and which in its free state is of thickness greater than the axial depth of said recess, said lip affording an abutment engageable with said reservoir to limit the compression of said sealing washer, detachable means for clamping said extension member to said reservoir and adapted to co-operate with said radial flange and engage with said external screw-threaded portion on the upper end of said reservoir, and a detachable closure cap for the upper end of said extension member.

3. Means as in claim 2 including means for preventing relative angular movement between said extension member and said reservoir comprising a notch part and a mating lip part, one of said parts being integral with said spigot and the other of said parts being disposed within the opening at the upper end of said reservoir.

4. Means as claimed in claim 2, wherein said extension member has at its upper end an external screw-threaded portion, and said detachable closure cap is provided with external screw threads for cooperation with said external extension member.

References Cited by the Examiner

UNITED STATES PATENTS

| | | | |
|---|---|---|---|
| 653,262 | 7/00 | Rodiger | 141—381 |
| 1,529,929 | 3/25 | Schwartz. | |
| 1,644,378 | 10/27 | Hirschler | 60—54.6 |
| 1,645,163 | 10/27 | Schwartz | 220—39 |
| 2,171,302 | 8/39 | Conner | 220—39 |
| 2,225,448 | 12/40 | Hamilton. | |
| 2,513,458 | 7/50 | Dion | 220—40 |
| 2,651,528 | 9/53 | Robinson | 220—39 X |
| 2,755,629 | 7/56 | Baish | 60—54.6 |
| 2,767,968 | 10/56 | Buettner | 60—54.6 |
| 3,023,924 | 3/62 | Boyer | 220—39 |
| 3,040,536 | 6/62 | Werner | 60—54.6 X |
| 3,041,837 | 7/62 | Jacoby | 220—44 |
| 3,059,671 | 10/62 | Kings | 60—54.6 X |

FOREIGN PATENTS 872,272   7/61   Great Britain.

FRANKLIN T. GARRETT, *Primary Examiner.*